J. B. SWEETLAND, OF PONTIAC, MICHIGAN.

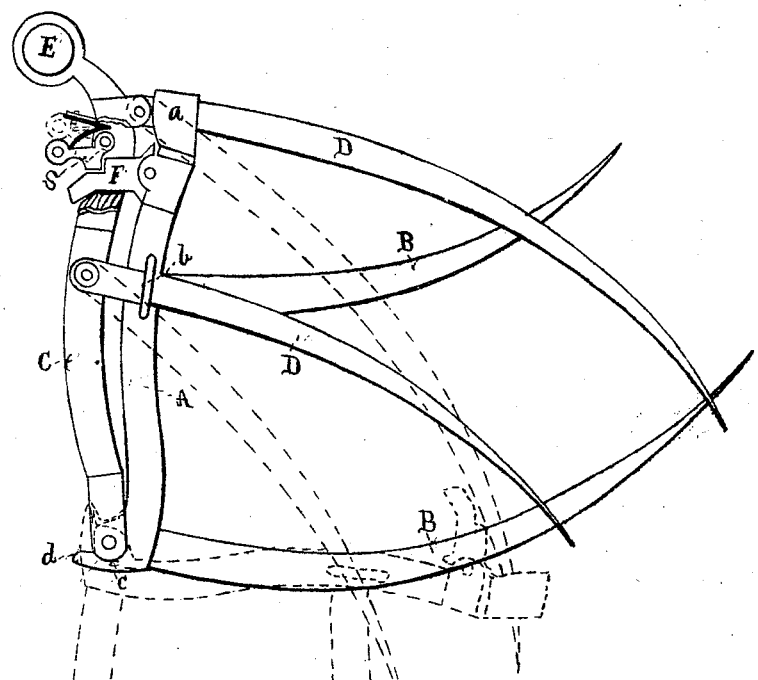

Letters Patent No. 88,991, dated April 13, 1869.

IMPROVEMENT IN HORSE HAY-FORKS.

The Schedule referred to in these Letters Patent and making part of the same.

*To all whom it may concern:*

Be it known that I, J. B. SWEETLAND, of Pontiac, in the county of Oakland, and in the State of Michigan, have invented certain new and useful Improvements in Horse Hay-Forks; and do hereby declare that the following is a full, clear, and exact description thereof, reference being had to the accompanying drawings, and to the letters of reference marked thereon.

The nature of my invention consists in the construction and general arrangement of "a horse hay-fork," which will be hereinafter fully set forth.

In order to enable others skilled in the art to which my invention appertains, to make and use the same, I will now proceed to describe its construction and operation, referring to the annexed drawings, which form a part of this specification, and which represent a side view of the hay-fork.

A represents a bar, of suitable dimensions, provided with two or more stationary tines, B B, which are curved upward, as shown in the drawing.

The bar A is, at its upper end, provided with a loop, a, and along the side of the bar may be other loops, b.

At the lower end said bar is provided with an ear, c, by means of which the bar is pivoted to the lever C, said ear extending into a slot in the lower end of the lever.

From the ear c extends a projection, d, which, when the bar A is let down, prevents it from turning any further than shown in red lines in the drawing; that is, so that the bar A may be horizontal or nearly so, and the tines B B point downward.

The lever C is provided with one or more tines, D D, which are pivoted to the same, and move in the loops a and b, on the bar A.

The tines D D are also curved, but in the opposite direction from the stationary tines B B.

It will be seen the points of these hinged or pivoted tines, when they are pressed down, describe a larger circle than the tine would indicate when down, and by so doing it takes in that much more hay than it would if it ran straight down, and consequently compressing the hay, which is a great advantage in pitching short hay and barley.

The upper end of the lever C, which may extend any desired distance above the bar A, is provided with a ring or handle, E, to which the hoisting rope is attached.

Near the upper end of the bar A is hinged or pivoted a trigger, F, which has a notch on its under side, and when the bar A is raised up against the lever C, said trigger passes through a slot in the lever, and held down by means of a pawl, e, so that the bar A, with its stationary tines B B, may be held up in the position shown in the drawings.

The pawl e is pressed into a notch on the upper side of the trigger F by means of a spring, i.

When the pawl e is raised up out of said notch, the weight of the fork and hay will at once lower the fork and discharge the hay.

Having thus fully described my invention,

What I claim as new, and desire to secure by Letters Patent, is—

1. The combination of a fork, having two stationary upwardly-turned tines, two movable tines, turned in an opposite direction, and a stop, d, to prevent the fork from swinging back too far, substantially as herein set forth.

2. The trigger F, constructed as described, and placed relatively to the bar A, substantially as and for the purpose set forth.

3. The lever C, provided with one or more adjustable or hinged tines, substantially as shown and described.

4. The arrangement of the hinged or pivoted trigger F, the dog or pawl e, and spring i, substantially as and for the purpose set forth.

In testimony that I claim the foregoing, I have hereunto set my hand, this 10th day of March, 1869.

J. B. SWEETLAND.

Witnesses:
LEOPOLD EVERT,
A. N. MARR.